United States Patent

Irving, Jr.

[11] 3,825,121
[45] July 23, 1974

[54] APPARATUS FOR THE CONTINUOUS FILTRATION OF THERMOPLASTIC OR ELASTOMERIC MATERIALS USED IN EXTRUSION PROCESSES

[75] Inventor: Edgar W. Irving, Jr., Somerville, N.J.

[73] Assignee: GK Systems, Inc., Flemington, N.J.

[22] Filed: June 1, 1973

[21] Appl. No.: 365,951

[52] U.S. Cl............... 210/132, 210/232, 210/332, 210/340
[51] Int. Cl............................................ B01d 29/36
[58] Field of Search .......... 210/332, 340, 341, 232, 210/DIG. 15, 132

[56] References Cited
UNITED STATES PATENTS

| 3,572,507 | 3/1971 | Juskevic............................ 210/340 |
| 3,727,767 | 4/1973 | Itter et al........................... 210/341 |
| 3,757,956 | 9/1973 | Bradel et al. ...................... 210/340 |
| 3,767,053 | 10/1973 | Bavin................................. 210/232 |

Primary Examiner—Roy Lake
Assistant Examiner—R. Daniel Crouse
Attorney, Agent, or Firm—Thomas E. Tate

[57] ABSTRACT

The disclosure is that of an invention directed to a dual unit changeover filter, particularly for use with hot melt plastics, in which the changeover from one unit to the other can be effected without adversely affecting the quality characteristics of the throughput. Sequentially operated valves, with appropriate bleed unit connecting passages, are employed to condition an idle filter unit for operation while still permitting the operating filter unit to operate properly until the idle filter unit has been placed on line, after which the previously operating filter unit becomes shut down.

9 Claims, 16 Drawing Figures

APPARATUS FOR THE CONTINUOUS FILTRATION OF THERMOPLASTIC OR ELASTOMERIC MATERIALS USED IN EXTRUSION PROCESSES

THE INVENTION

This invention relates generally to new and useful improvements in filters for those types of thermoplastic or elastomeric materials used in extrusion processes and particularly seeks to provide a novel filter that is constructed to permit a filter change to be effected without requiring a complete equipment disassembly and to permit a filter change to be effected while the extrusion process continues without causing unacceptable variations in process stability or quality such as film gauge specifications.

Heretofore, many different types of filters have been developed for inclusion in an extruder assembly ahead of the extrusion die, ranging from a simple screen or perforated shell, which requires a complete shutdown of the extruder in order to gain access for cleaning or replacement, to the equivalent of Y-valve units that simply switched the plastic flow from one arm to the other in order to gain access to the filter carried within the then unused arm in an effort to avoid shutdown of the extruder assembly during filter changes. However, even in these latter types of filter assemblies no provision is made to adequately compensate for or eliminate the problems resulting from surging, airlocks or pockets in the plastic mass or from quality-damaging contamination resulting from either improper or nonexistent purging of the involved chambers or passages in or upstream of the filter assembly.

The filter unit constructed in accordance with this invention overcomes such problems and enables filter changes to be effected without either causing a shutdown of the extruder line or adversely affecting the quality or throughput characteristics of the extrudate.

Therefore, an object of this invention is to provide a novel filter for use with hot melt extrudates that is constructed to permit a contained filter to be replaced without disrupting or adversely affecting the throughput of the extrudate.

Another object of this invention is to provide a filter of the character stated in which the flow of extrudate may be alternately directed through one or the other of two filter canisters in such a manner that the active canister may be deactivated and readily replaced without affecting the flow of extrudate and the inactive other canister then accepts the extrudate flow only after having become properly purged and filled with uncontaminated or undeteriorated extrudate.

Another object of this invention is to provide a filter of the character stated in which means are provided for automatically effecting a change of extrudate flow from the first canister to the other thereof whenever a pressure rise increases to the point at which partial or complete restriction of extrudate flow through the first canister is indicated, thereby rendering the first canister available for cleaning or replacement and permitting the second canister to continue the filtering of the extrudate without adverse effect.

Another object of this invention is to provide a filter of the character stated which includes means for bleeding purging extrudate from each canister chamber and its associated passages prior to its use in continuing active filtration.

Another object of this invention is to provide a filter of the character stated which includes an adjustable valve for maintaining a constant discharge pressure seen by the extruder which otherwise would vary as the flow through the canister in use becomes progressively restricted.

Another object of this invention is to provide a filter of the character stated in which changes in filter capacity, and thus time between changes, can be readily effected simply by substituting a longer or shorter canister for an installed canister at any time such installed canister is out of operation for cleaning or replacement while the other thereof remains operational.

A further object of this invention is to provide a filter of the character stated which is relatively simple in design, rugged in construction and economical to manufacture.

With these and other objects the nature of which will become apparent, the invention will be more fully understood by reference to the drawings, the accompanying detailed description and the appended claims.

Referring to the drawings in detail the invention, as illustrated, is embodied in a two canister or dual filter including a body generally indicated 5 adapted to be fixedly installed between an upstream extruder spool connector 6 and a downsteam die connector 7. Hot melt unfiltered extrudate flows into the filter through an axial passage 8 in the spool connector 6 and the filtered extrudate flows through a corresponding axial passage 9 in the die connector 7. A pair of filter canister assemblies, respectively generally indicated 10 and 11, are affixed to the body 5 and project laterally in opposite directions with respect thereto for alternate use in filtering the extrudate prior to its admittance into the die connector 7.

Flow of the unfiltered extrudate is admitted into the body 5 through a longitudinal passage 12 which opens into internal valve-controlled chambers and passages which direct the flow through whichever of the canister assemblies 10 and 11 is selected for use as will be hereinafter more fully described.

Proceeding from the upstream to the downstream side of the filter, the hot melt entering the passage 12 first passes a valve 13 threadably engaged through the top of the body 5 and having a plug 14 adapted for projection into the passage 12 whereby to regulate the flow, and thus the pressure, of the unfiltered extrudate.

Then the unfiltered extrudate passes into a chamber containing (see FIG. 3) a valve closure member indicated 15, having symetrically opposed upper and lower sealing faces 16 and 17, carried by a valve stem having an upper portion 18 rotatably mounted within a removable retainer 19 having a valve seat 20 complementary to the upper valve face 16 and a lower portion 21 rotatably mounted within a removable retainer 22 having a valve seat 23 complementary to the lower valve face 17. The free end of the upper stem portion 18 is flattened or otherwise configured to permit the use of a wrench or other tool to rotate the stem, and the lower stem portion 21 is threadably engaged in a fixed bushing 24 in order to effect axial movement of the valve closure member 15 whenever the stem is rotated in either direction.

Figure 3:
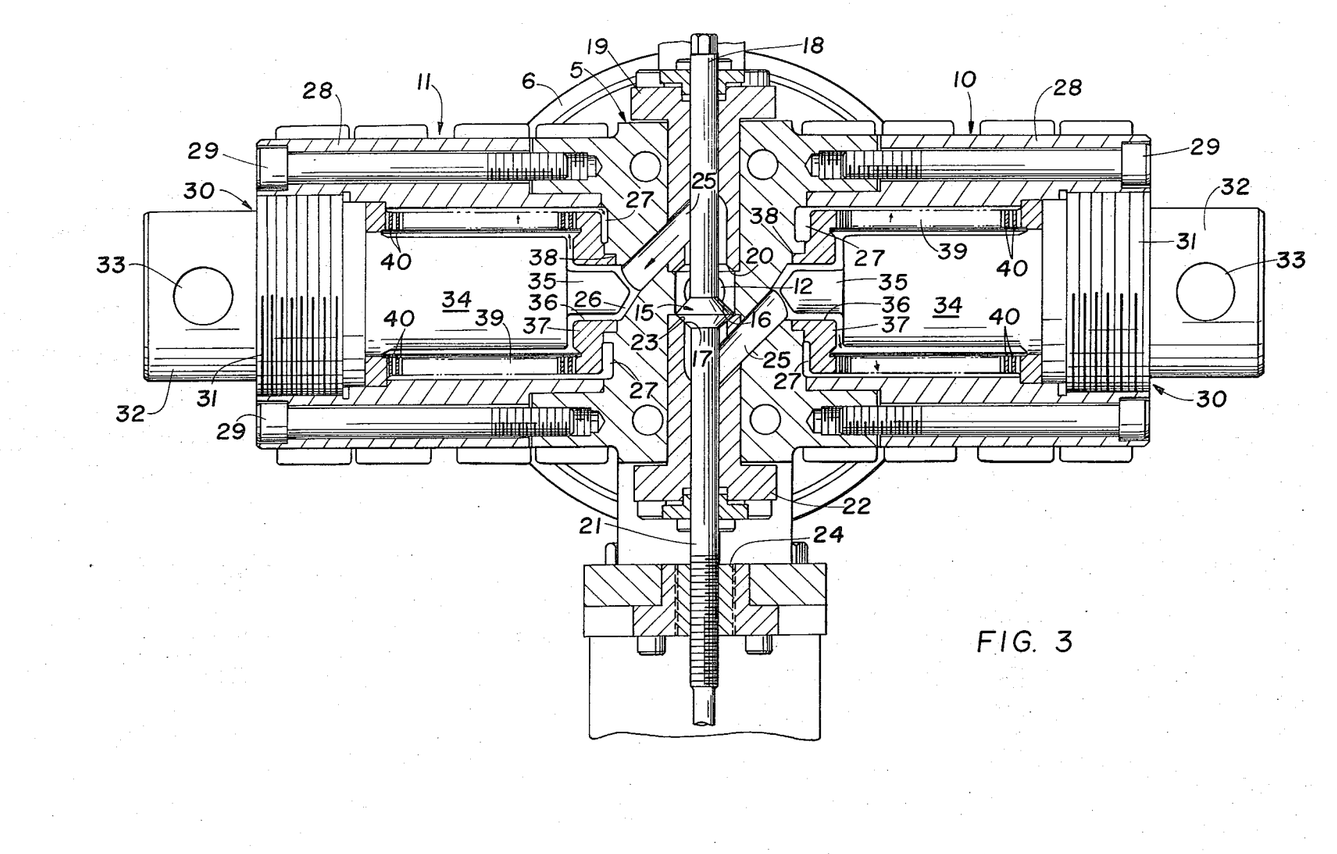
FIG. 3 is a vertical transverse section taken along line 3—3 of FIG. 2.
Figure 4:
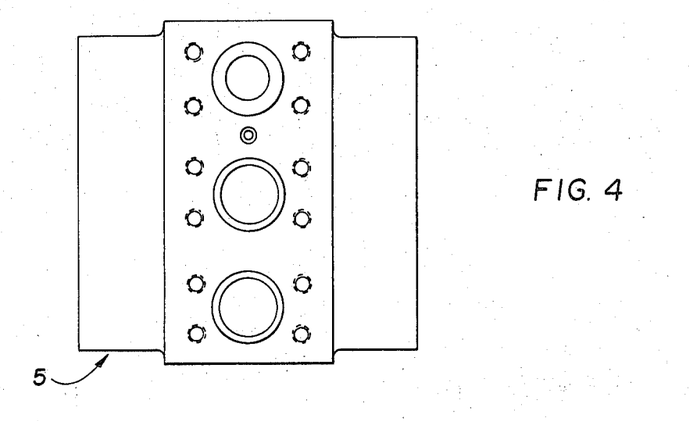
FIG. 4 is a top plan view of the main body or casing of the filter.
Figure 5:
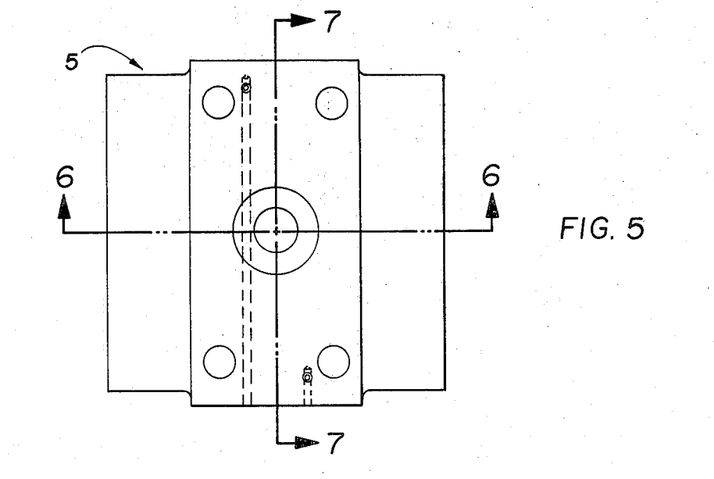
FIG. 5 is a front or downstream elevation of the body shown in FIG. 4.
Figure 6:
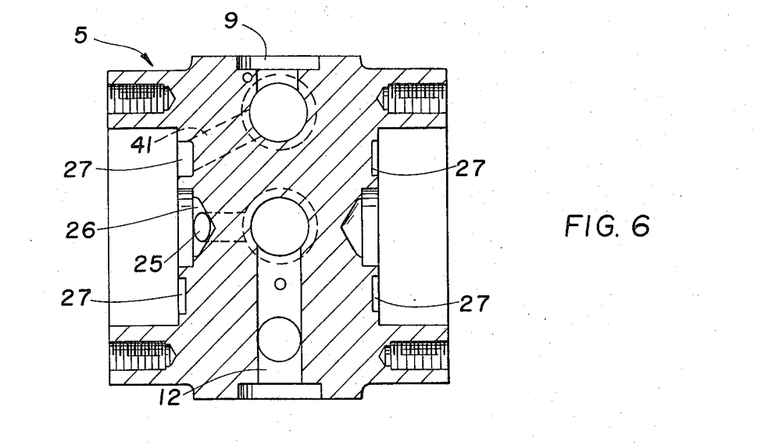
FIG. 6 is a horizontal section taken along line 6—6 of FIG. 5.
Figure 7:
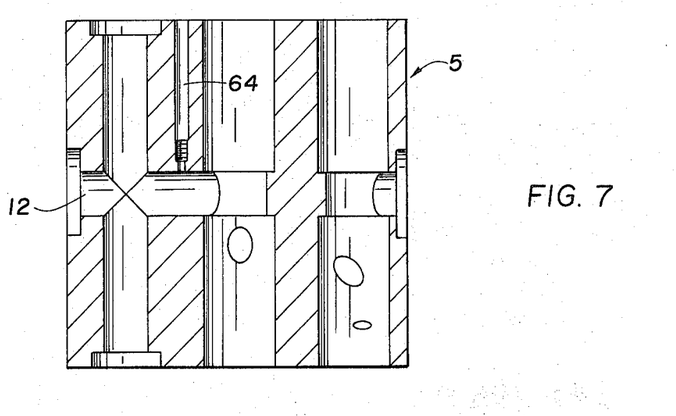
FIG. 7 is a vertical longitudinal section taken along line 7—7 of FIG. 5.
Figure 8:
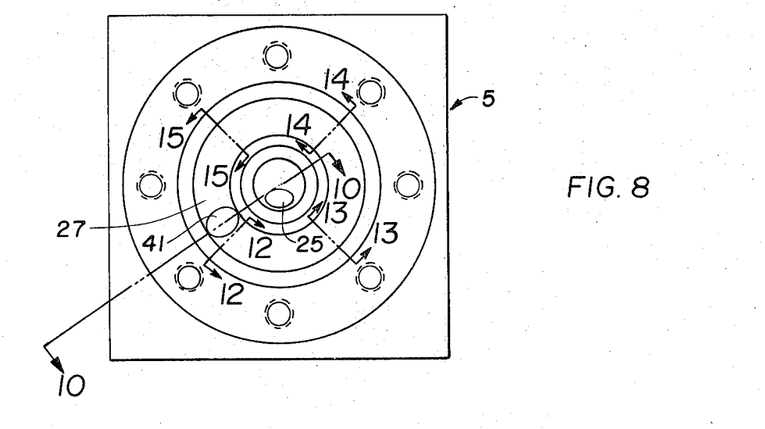
FIG. 8 is a right end elevation of the body of FIG. 5.
Figure 9:
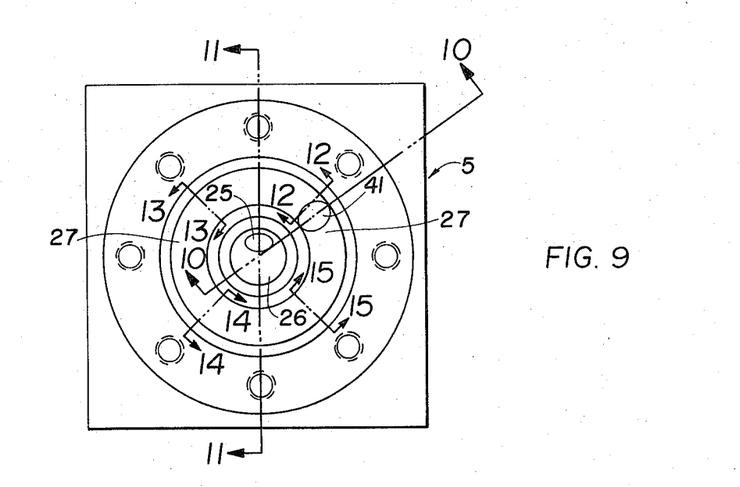
FIG. 9 is a left end elevation of the body of FIG. 5.
Figure 10:
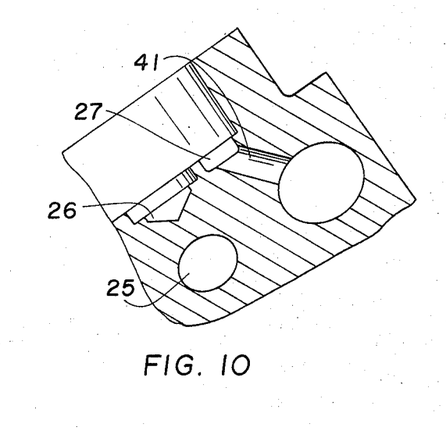
FIG. 10 is a detail radial section taken along line 10—10 of FIGS. 8 and 9.
Figure 11:
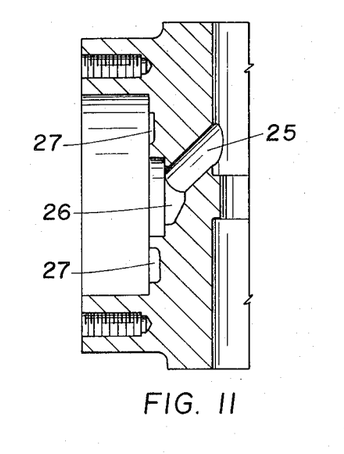
FIG. 11 is a detail vertical section taken along line 11—11 of FIG. 9.
Figure 12:
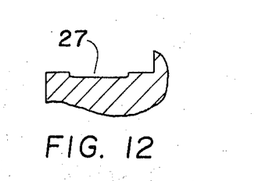
FIGS. 12–15 are detail transverse sections of the tapering depth circular channels shown in FIGS. 6, 8 and 9 and are respectively taken along lines 12—12, 13—13, 14—14 and 15—15 of FIGS. 8 and 9.
Figure 13:
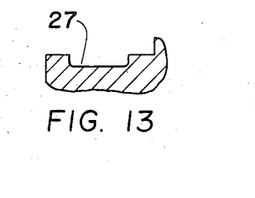
Figure 14:
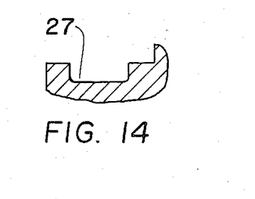
Figure 15:
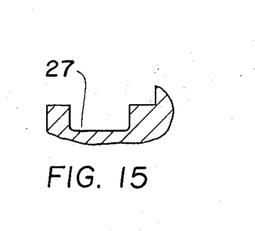

At this stage of the description it will be assumed that the valve member 15 is in its lower seated position as shown in FIG. 3 so that the canister assembly 11 is operative for filtering purposes and the canister assembly 10 is inoperative for filtering purposes so that its contained filter may be removed for cleaning or replacement and that the unfiltered extrudate entering through the passage 12 must pass upwardly around the upper valve stem portion 18.

From this point unfiltered extrudate passes through an outwardly and downwardly directed passage 25 into communication with the inner end of a well 26 formed in the associated face portion of the body 5 and is encircled at its open outer end by an annular groove 27 (see FIGS. 6, 8, 9 and 12–15) having a progressively tapering depth along its entire circumferential axis in order to be self-purging with respect to the flowing plastic material.

The canister assembly 11 is secured to that face of the body 5 having the well 26 formed therein and includes an outer tubular shell 28 removably secured to the body as by bolts 29. A filter mounting plug generally indicated 30 includes a hub 31 threadably engaged in the outer end of the shell 28, an outer stud or cap 32 having a transverse bore 33 for reception of a turning lever, and an inwardly projecting plug 34 terminating in a smaller diameter extension 35 that is received within the central aperture 36 of the bottom 37 of a filter screen support having an annular flange 38 seated in the wall of the well 26. The outer edge portion of the bottom 37 covers the top or outer face of the annular groove 27 so that the walls of the groove and the associated face of the bottom 37 together define a passage of generally rectangular cross-section but of progressively increasing area from 0° to 360° along its axis.

Although the plug 30 has been described as if it were of one piece construction, it is considered more practical to employ a two piece construction in which the hub 31 and its stud 32 would be one piece serving as a breech plug and th plug 34 and its extension 35 would be the other part, thus making it unnecessary to handle the weight of the hub 31 during cleaning of the plug 34 or cleaning or replacement of the separately removable filter screen.

The bottom 37 carries a tubular extension 39 that contains and supports one or more of the usual tubular filter screens (not numbered) and is provided with a multiplicity of radial orifices 40. The extension 39 fits freely over the plug 34 and has an internal diameter to provide radial clearance between the contained filter screen and the plug 34 and an external diameter to provide radial clearance internally of the shell 28.

The canister assembly 10 is an opposed twin of the above described canister assembly 11 and need not be described in detail except to mention that the passage 25 thereof is symmetrically opposed to that for the canister assembly 11 and is directed upwardly and outwardly and the annular groove 27 in the canister assembly 10 is oriented or rotated 180° with respect to that for the canister assembly 11.

Still referring to the canister assembly 11, the unfiltered extrudate entering the well 26 from the passage 25 then flows around the exterior of the plug extension 35 and the plug 34, thence through the filter screen and the orifices 40 and thence back in a reverse direction along the outside of the tubular extension 39 into the annular groove 27 and thence into a passage 41 (see FIGS. 6, 9, 10 and 11) which in turn discharges into the die connector passage 9 past a second control valve as will be hereinafter more fully described, which valve at this stage is positioned to permit such flow of the filtered extrudate from the canister assembly 11 to occur.

Figure 1:
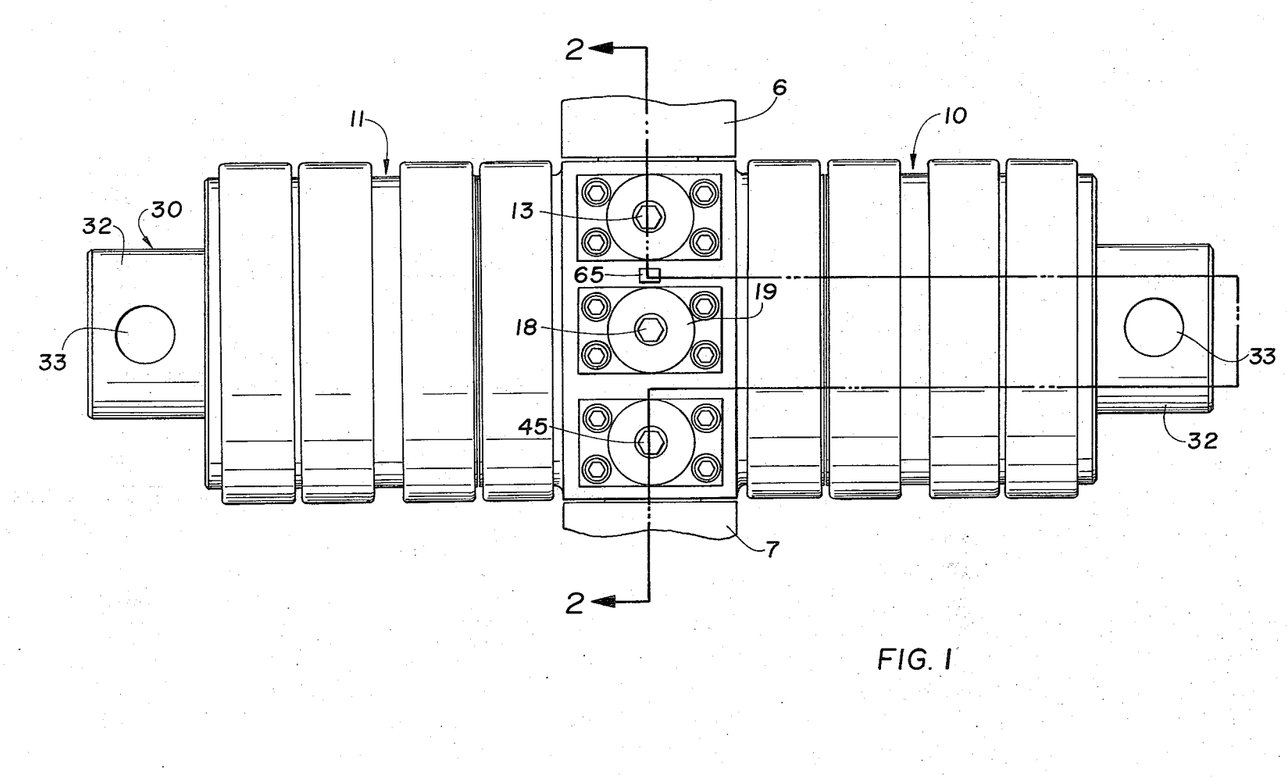
FIG. 1 is a top plan view of a two canister change over filter constructed in accordance with this invention.
Figure 2:
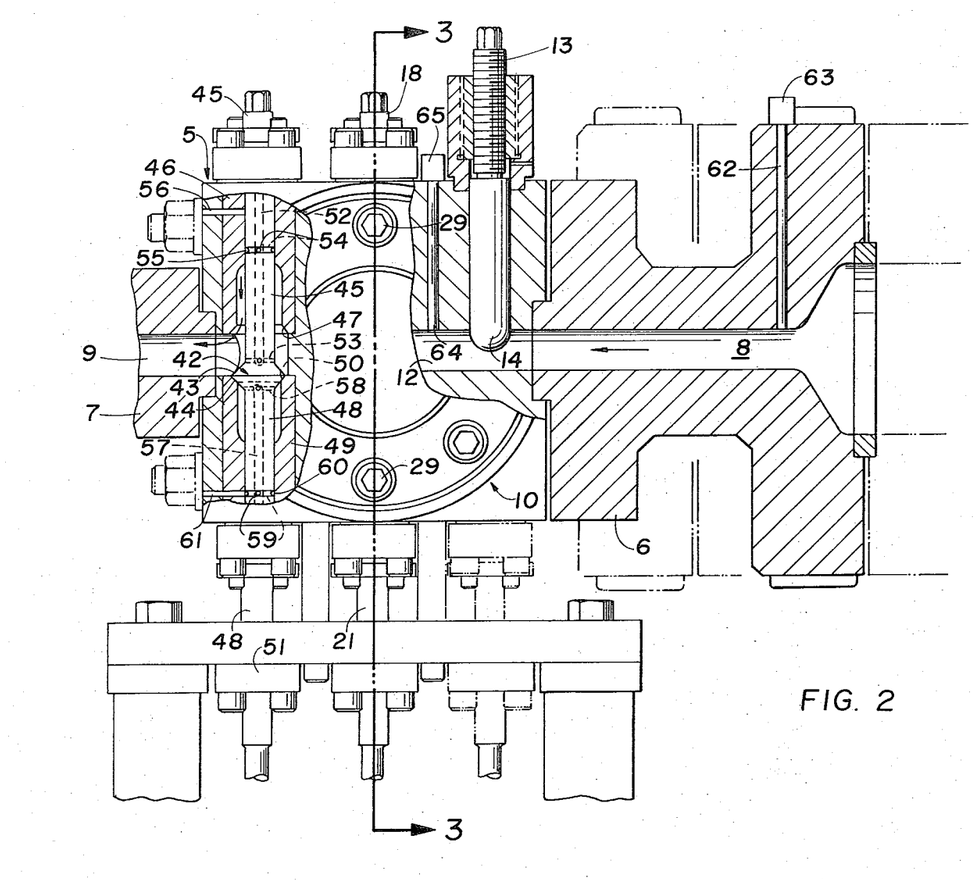
FIG. 2 is a vertical longitudinal section, partly in right end elevation, taken along line 2—2 of FIG. 1.

The second control valve (see FIG. 2) includes a valve closure member indicated 42, having symmetrically opposed upper and lower sealing faces 43 and 44, carried by a valve stem having an upper portion 45 rotatably mounted within a removable retainer 46 having a valve seat 47 complementary to the upper valve face 43 and a lower portion 48 rotatably mounted within a removable retainer 49 having a valve seat 50 complementary to the lower valve face 44. The free end of the upper stem portion 45 is flattened or otherwise configured to permit the use of a wrench or other tool to rotate the stem, and the lower stem portion 48 is threadably engaged in a fixed bushing 51 in order to effect axial movement of the valve closure member 42 whenever the stem is rotated in either direction.

As mentioned above, this second control valve, at the stage illustrated, is positioned to permit free passage of the filtered extrudate from the canister assembly 11 into the passage 9 of the die connector 7. Thus the closure 42 is at its lower position and its sealing face 44 is seated against the seat 50 of the lower retainer 49.

For bleeding and pressure equalizing purposes as will be hereinafter more fully described, the upper valve stem portion 45 is provided with an internal closed-end axial bore 52, the lower end of which is in open communication with a plurality of radial bores 53 located adjacent the top of the valve closure member 42 and opening to the exterior of the valve stem, and the upper end of which is in open communication with a plurality of radial bores 54 which in turn open into communication with an annular groove 55 adapted to be brought into and out of registry with a bleed passage 56 opening into the atmosphere.

Similarly, the lower stem portion 48 is provided with an axial bore 57 upper radial bores 58 located adjacent the bottom of the valve closure member 42, and lower radial bores 59 opening into communication with an annular groove 60 adapted to be brought into and out of registry with a bleed passage 61 opening into the atmoshpere.

Now, at this stage the filter of canister assembly 11 continues in use and it is assumed that the corresponding filter in canister assembly 10 is ready for use, although not yet purged of air or filled with extrudate which must take place before it properly can be placed into its filtering operation.

Accordingly, the following sequence of operation must occur before the canister assembly 10 should be operative and also to render the canister assembly 11 inoperative in order to permit the cleaning or replacement of its filter without adversely affecting the flow continuity and quality of the extrudate:

1. The valve closure member 15 (FIG. 3) should be lifted a short distance above the seated position shown in FIG. 3 to permit a minor portion (say, 1 to 2 percent) of the inflowing extrudate to pass downwardly into the chamber therebelow and thence into the canister assembly 10 through its own entrance passage 25, which as heretofore described is symmetrically opposed to the corresponding passage 25 of the canister assembly 11, thus filling the canister assembly 10 with extrudate and forcing the bled products to be expelled through the radial bores 58, the axial bore 57 and the radial bores 59 of the lower valve stem portion 48 through the lower bleed passage 61 from which the bled materials pass into the atmosphere and subsequently are collected and disposed.

2. When the flow from the bleed passage 61 shows that the contents of the canister assembly 10 are free from contaminants, the valve closure member 15 is raised farther to its center position between the seats 20 and 23 at which time the valve closure member 42 (FIG. 2) should be raised until its upper face 43 is seated against the seat 47, after which the valve closure member 15 is raised to its full extent in order to seat its upper face 16 against the seat 20 (FIG. 3). At this point the bleed passage 61 has been closed off by movement of the lower stem portion 48 and the upper bleed passage 56 has become open as the result of the corresponding movement of the upper stem portion 45 and is ready for its own bleeding function whenever the now shut down canister assembly 11 is to reactivated by a reverse sequence of valve operations.

Pressure in the canister assembly 11 now has been relieved by a small amount of weeping or bleeding through the upper stem bores and passages 53, 52, 54 and 56 so that its filter can readily be removed after removal of the plug 30.

3. As soon as the filter of the canister assembly 11 has been replaced, that assembly can be placed back "on line" simply by reversing the sequence of operations of the valve closure members 15 and 42, thereby shutting down operation of the canister assembly 10 to enable replacement or cleaning of its filter, again without disruption of the over all flow or physical condition of the throughput extrudate.

It should be understood that if for any reason it should become desirable or necessary to use both of the canister assemblies 10 and 11 simultaneously in order to gain a temporary increase in filter capacity, such combined use can be easily effected simply by positioning both of the valve closure members 15 and 42 at their midpoints of movements. Of course, such a combined usage should not continue for any substantial length of time, otherwise, it would become necessary to shut down the extruder to replace both filters, rather than one or the other as in the case of normally contemplated operations.

It also should be understood that because the canister assemblies 10 and 11 are constructed in the manner disclosed, it is very easy to either increase or decrease the filter capacity of each as desired, simply by replacing the canister shells 28 with longer or shorter shells for use in connection with correspondingly longer or shorter filters.

Although it is believed that the foregoing description provides an adequate and clear understanding of the construction and general operation of this dual changeover filter, certain additional refinements in the operating means may be desirable and now will be briefly described.

The valve 13, as noted above, is selectively adjusted to maintain a uniform pressure of the input extrudate since it is that pressure that controls the performance of the extruder and would otherwise vary as the filter screen in use becomes progressively clogged. Accordingly, it is desirable that rather than relying upon an operator's powers of observation of the characteristics of the material extruded through the die connector 7 in order to determine whether or not the valve 13 should be adjusted, the spool connector 6 (see FIG. 2) may be provided with a pressure tap 62 for operative connection with a pressure indicating device schematically shown at 63 to provide immediate visual indication of a pressure change of a magnitude sufficient to require adjustment of the valve.

A further refinement in operation of the valve 13 may be effected through use of a power drive therefor (not shown), the motor of which is incorporated in a servo loop controlled by pressure changes sensed through the pressure tap 62, thus providing automated operation of the valve.

Since one of the objects of this invention is to be able to effect the change from one canister assembly to the other without affecting the characteristics of the flowing extrudate either by surging or by permitting the entrance of air or other contaminants, the changeover is effected over a substantial period of time, measured in minutes rather than seconds, thus providing adequate time for manually operating and sequencing the valve closure members 15 and 42. However, for certain types of installations it may be desirable to automate the operating and sequencing of the valves and this may be done by providing the valve body 5 with a pressure tap 64 (see FIG. 2) and installing therein a pressure transducer, schematically indicated at 65, which is incorporated into a control circuit (not shown) for individually actuating and sequencing driving motors (not shown) operably connected to the respective stems of the valve closure members 15 and 42.

It is believed that illustration of the motor and servo loop to automate operation of the valve 13 and the corresponding motors and controls to automate operation of the valve closure members 15 and 42 is not needed, since all such components per se are well known and commercially available, as are their modes of connections and uses.

Figure 16:
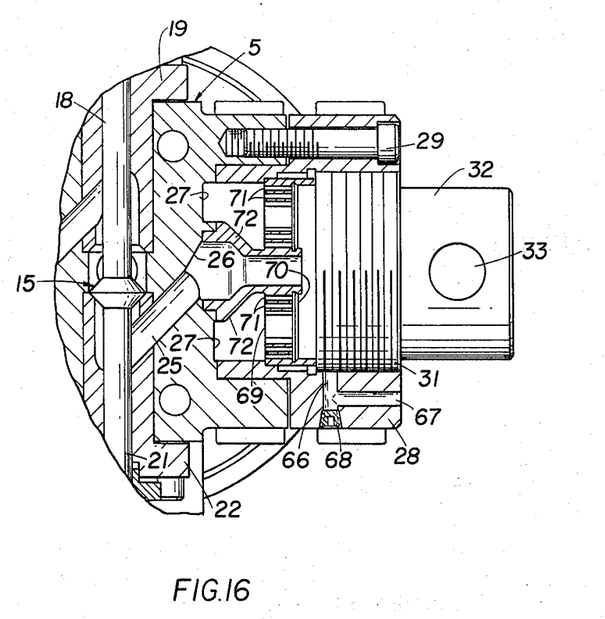
FIG. 16 is a detail vertical transverse section similar to the right end portion of FIG. 3 but showing how the changeover units can be readily adapted for use with disc filters rather than tubular filters, and further showing the provision of a safety pressure relief system at the breech plug.

As shown in FIG. 16 of the drawings, each canister assembly 10, 11 also is provided with a safety pressure relief system which simply comprises a radial bore 66 formed in the wall of the shell 28 at a location such that its inner end is closed by the hub 31 of the breech plug when the breech plug is fully seated, and a communicating longitudinal bore 67 opening to the atmosphere. The outer end of the radial bore 66 is closed as by a plug 68.

Thus, the bores 66 and 67, together form a combined passage for the relief of any pressure within the shell 28 during removal of the breech plug but before the breech plug has become completely disengaged for access to the interior. Such a safety requirement would exist, for example, if the canister were actually "on line" and an operator inadvertently started to remove the breech plug in the belief that the canister was actually off line. However, even if the particular canister is off line, the interior could become pressurized to some extent by leakage around the valves or by a plugged or malfunctioning bleed port. Accordingly, partial retraction of the breech plug will warn of the condition since the bore 66 will become opened and any internal material under pressure will tend to exhaust therethrough and through the bore 67. A temporary or short duration of exhaust would indicate a release of the residual pressure, after which the complete removal of the breech plug may be safely effected. On the other hand, a continuous exhaust would indicate either a malfunction that should be corrected before complete removal of the breech plug or that the involved canister is in an in line status, thus requiring the breech plug to be reseated in order to continue with the in line operation.

The adaptability of this changeover filter unit to various types of arrangements of filter screens is further illustrated by FIG. 16 of the drawings which shows the use of a disc filter rather than a tubular filter as heretofore described and illustrated.

Here, the disc like bottom 37 and its associated tubular filter screen support 39 of FIG. 3 are replaced by a disc 69, for the support of one or more filter discs 70, which has a multiplicity of longitudinal orifices 71 for transmission of the filtered extrudate into the annular groove 27. A hollow stem 72 admits the unfiltered extrudate from the upwardly directed passage 25 into the void between the filter discs 70 and the opposed face of the breech plug hub 31. Obviously, in this variation the length of the shell 28 is much shorter than that required for use with tubular filters.

Thus, it has been shown that virtually regardless of the specific type of filter to be used, the changeover filter of this invention is readily adaptable for all types of filters per se providing that the filters per se can be operationally retained within either of the canister assemblies 10 or 11.

It is of course to be understood that variations in arrangements and proportions of parts may be varied within the scope of the appended claims.

I claim:

1. In a dual changeover filter for flowing liquid material, a body having an entrance passage for receiving an incoming flow of unfiltered liquid and an exit passage for discharging the flow of filtered liquid, said body being internally provided with two passage-connected valve receiving chambers, one of which is located in the upstream portion of said liquid flow and the other of which is located in the downstream portion thereof, each of said valve receiving chambers being provided with a pair of centrally located opposed spaced upper and lower valve seats; first and second flow control valves respectively located in operative association with each of said two chambers, each of said flow control valves being provided with a double faced valve element interposed between a pair of said valve seats and adapted to be brought into or out of seating engagement with either valve seat of its associated pair thereof, each of said flow control valves being provided with opposed upper and lower stem portions operably mounted in said body for relative movement with respect thereto; separate means for operating each of said valves; a first filter unit mounted on said body in operative communication through said valves with said incoming flow of unfiltered liquid whereby to filter same and permit the thus filtered liquid to pass through said discharge passage; a second filter unit mounted on said body in operative communication through said valves with said incoming flow of unfiltered liquid whereby to filter same and permit the thus filtered liquid to pass through said discharge passage; said upstream valve element being normally positioned to direct the incoming liquid flow through said first filter unit while preventing liquid flow through said second filter unit, said downstream valve element being normally positioned to pass the filtered liquid from the said first filter unit to said discharge passage while preventing flow thereof into the second filter unit; said body being provided with an upper bleed passage extending from the exterior thereof into communication with the upper stem portion of said second flow control valve and being provided with a lower bleed passage extending from the exterior thereof into communication with the lower stem portion of said second control valve, the upper and lower stem portions of said second flow control valve respectively being provided with bleed passages extending from the respective faces of the said double faced valve element of said second flow control valve for communication with the respective of said upper and lower body bleed passages in accordance with the axial positioning of said second flow control valve; said valve operating means being effective to alter the positions of said upstream and downstream valves from their said normal positions to other positions whereby to condition said second filter unit for activation while said first filter unit remains operative and to then shut off said first filter unit and direct the flow through said second filter unit without disruption to or change in the characteristics of the flowing liquid while still permitting the filtered liquid to pass into said discharge passage.

2. The changeover filter of claim 1 in which each of said filter units is removably attached to said body.

3. The changeover filter of claim 1 additionally including an adjustable valve located adjacent the upstream portion of said body for controlling the flow of entering liquid.

4. The changeover filter of claim 2 in which each said filter unit comprises an outer tubular shell having its inner end secured to said body, a tubular filter screen support removably mounted within said shell for communication with a passage leading from one of said valves, a plug occupying substantially all of the interior of said tubular filter screen support and a member fitted within the outer end of said shell for closing same and for retaining said tubular filter screen support and said plug in place; and additionally including a self-purging channel of progressively changing cross-section formed in said body for receiving the filtered liquid from said filter and passing said filtered liquid into a communicating discharge passage formed in said body.

5. The changeover filter of claim 3 additionally including means for automatically adjusting said adjustable valve in response to pressure changes occurring within said body.

6. The changeover filter of claim 1 additionally including means for automatically operating and automatically sequencing the operating of said valves in response to a predetermined pressure rise within the filter unit then in use whereby to deactivate said filter unit and to activate the other thereof.

7. The changeover filter of claim 2 in which each said filter unit comprises an outer tubular shell having its inner end secured to said body, a filter screen support and filter removably mounted within said shell for communication with a passage leading from one of said valves, and a member fitted within the outer end of said shell for closing same and for retaining said filter screen support and filter in place.

8. The changeover filter of claim 4 in which said outer tubular shell is provided with a passage communicating from the interior to the exterior thereof, the interior end of said passage being located to be normally covered by said fitted closing member when said closing member is fully in place and exposed for communication with the exterior of said tubular shell whenever said fitted closing member is partly retracted from its fully in place position.

9. The changeover filter of claim 7 in which said outer tubular shell is provided with a passage communicating from the interior to the exterior thereof, the interior end of said passage being located to be normally covered by said fitted closing member when said closing member is fully in place and exposed for communication with the exterior of said tubular shell whenever said fitted closing member is partly retracted from its fully in place position.

* * * * *